United States Patent [19]

Witthandt

[11] 4,148,009

[45] Apr. 3, 1979

[54] METHOD AND APPARATUS FOR ELECTRONICALLY RETOUCHING

[75] Inventor: Helge Witthandt, Kiel, Germany

[73] Assignee: Dr. Ing. Rudolf Hell, GmbH, Fed. Rep. of Germany

[21] Appl. No.: 832,233

[22] Filed: Sep. 12, 1977

[30] Foreign Application Priority Data

Sep. 17, 1976 [DE] Fed. Rep. of Germany ....... 2641835

[51] Int. Cl.[2] ............ G06K 9/12

[52] U.S. Cl. ............ 340/146.3 H; 340/146.3 MA

[58] Field of Search .......... 340/146.3 MA, 146.3 AE, 340/146.3 H, 146.3 AG, 146.3 R; 235/92 PC; 358/282, 284, 296; 346/94; 250/567, 572

[56] References Cited

U.S. PATENT DOCUMENTS

| | | | |
|---|---|---|---|
| 3,609,685 | 9/1971 | Deutsch | 340/146.3 AE |
| 3,753,229 | 8/1973 | Beun et al. | 340/146.3 MA |
| 3,846,754 | 11/1974 | Oka et al. | 340/146.3 MA |
| 3,887,762 | 6/1975 | Uno et al. | 235/92 PC |

FOREIGN PATENT DOCUMENTS

| | | | |
|---|---|---|---|
| 1153703 | 5/1969 | United Kingdom | 340/146.3 MA |

*Primary Examiner*—Leo H. Boudreau

*Attorney, Agent, or Firm*—Hill, Gross, Simpson, Van Santen, Steadman, Chiara & Simpson

[57] ABSTRACT

A method of electronically retouching a pattern, for example in connection with a type symbol scanning apparatus for obtaining type data for an electronic light type setting arrangement or the like, for the derivation of recording data relating thereto, in which the pattern is scanned in a dot and image line fashion to form an image signal from a sequence of alternating conditions representative, of the black and white segments of an image line with the sequence of conditions being transformed into recording data, in which the length of the respective segments are compared with predetermined minimum lengths and if a segment is below the minimum length, i.e., represents a defect, it is transformed into recording data of the type corresponding to that of the immediately preceding condition, thereby automatically eliminating such defect segment.

8 Claims, 6 Drawing Figures

METHOD AND APPARATUS FOR ELECTRONICALLY RETOUCHING

BACKGROUND OF THE INVENTION

The invention relates to a method for the electronic retouching of a pattern in connection with the production of recording data therefrom, in which an image signal is produced by scanning the pattern in dot and image line fashion, whereby the image signal comprises a sequence of alternating conditions in correspondence to the black and white segments of the scanned pattern, with such sequence of conditions being transformed into the desired recording data.

The invention is, for example, of particular application to type symbol or character scanning apparatus for producing type data to be used in an electronic light setting mechanism. It is therefore desirable to initially explain the construction and operating characteristics of known apparatus of this type.

An electronic type setting mechanism is adapted to effect a recording of the desired light composition in conjunction with an electron beam tube, utilizing digitally stored type data, i.e., type characters or symbols, etc. Such type symbols can, for example, represent letters, numbers, punctuation, and special signs, as well as graphic illustrations such as various configurations, diagrams and line drawings.

The text to be type set is initially transformed into text data which represents the type setting instructions for the light type setting mechanism. The text data is then consecutively read out from a type data store in the form of type data required for the recording, with the type data read out being transformed into analog deflection voltages for the positioning of the electron beam on the screen and into video information for the light-dark control of the electron beam. Each type character or symbol read out of the type data store is recorded on the screen of the electron beam tube in the form of a plurality of closely adjoining vertical image lines with a line scan running in line direction.

Each image line is composed of light and dark segments in accordance with the configuration of the outline contours of the type character to be recorded, formed by the light-dark control of the electron beam in accordance therewith. The individual type characters are associated into words and sentences, line-by-line on the screen during the recording operation. A film exposure of the screen image is then effected with the film being suitably advanced after the recording of one or more lines. The exposed and developed film functions then as a correction proof, or may actually represent the printing form for the subsequent offset printing operation.

Prior to the production of an electronic light type composition, the type data required for the typesetting operation, which would normally merely be transferred from a data carrier into the type data store of the light typesetting device prior to the type setting operation, must be obtained for storage on the data carrier.

The type data is produced in conjunction with a type character scanning apparatus, in which an enlarged graphic type character or symbol pattern is produced for each type character or symbol, which is scanned by an opto-electron device in dot and image line fashion to produce an image signal representative thereof. The type character, as a result of the scanning, is divided into a plurality of vertically oriented parallel image lines, with the scanning device being advanced one step to the next image line after the completion of the scanned line. Each image line, is divided into individual scanning elements of a predetermined arbitrarily selected scanning scheme.

The successive black and white segments of the image lines, may be sequentially coded in correspondence to the contours of the type character involved, with the individual segment lengths being measured as multiples of the scanning elements, and the respective number of the scanning elements allocated to the individual segments representing the black or white values being entered on a data carrier in image line fashion as the type data.

In the graphic production of a type character pattern for use in the scanning apparatus, the outline of the type character is initially produced on a white pattern carrier, and the outline subsequently filled in with black coloring material or ink. While care is taken in connection with such operation to have the ink very evenly covering the desired "black" areas, in order to prevent "white blemishes" or "defects" in the type character so formed, and to avoid ink spatters etc. on the white pattern which would form "black blemishes" or "defects," such "defects," will often times appear. In addition, the carrier should not contain any contaminants in the form of indentations or other physical defects in the carrier per se, and likewise dust particles should be carefully removed from the pattern prior to its use.

As defects of the type mentioned are evaluated by the scanning device as image information and consequently transformed into incorrect type data, in the conventional methods of obtaining type data, such defects must be initially recognized by an operator and thereafter removed in a careful time-consuming retouching operation prior to the scanning thereof, which results in a considerable disadvantage.

Similar problems also arise in patterns involving engraving and scanner techniques, and in connection with patterns for design scanning apparatus and the like.

BRIEF SUMMARY OF THE INVENTION

The present invention is directed to a method in which defects in a pattern are automatically eliminated during the scanning operation, thereby eliminating expensive and time-consuming retouching of the pattern by hand.

This is accomplished by establishing minimum lengths for respective black and white conditions of the image signal, continuously comparing the value of each actual condition length with the value of the corresponding established minimum length, and transforming the condition having a lesser length than the minimum length into recording data of the same value type as that of the immediately previous condition. Thus, the value of a black defect will be added, as white information, to the value of the immediately preceding white segment, and the value of the immediately following white segment will be added to the previous value total of the preceding white and defect segments. A corresponding correction will be made for a "white" defect in a black area. The combined values are then supplied to the data carrier for subsequent use.

In the event no defects are found, the value involved will be supplied, unchanged, to the data carrier.

BRIEF DESCRIPTION OF THE DRAWINGS

In the drawings wherein like reference characters indicate like or corresponding parts.

DETAILED DESCRIPTION OF THE INVENTION

Figure 1:
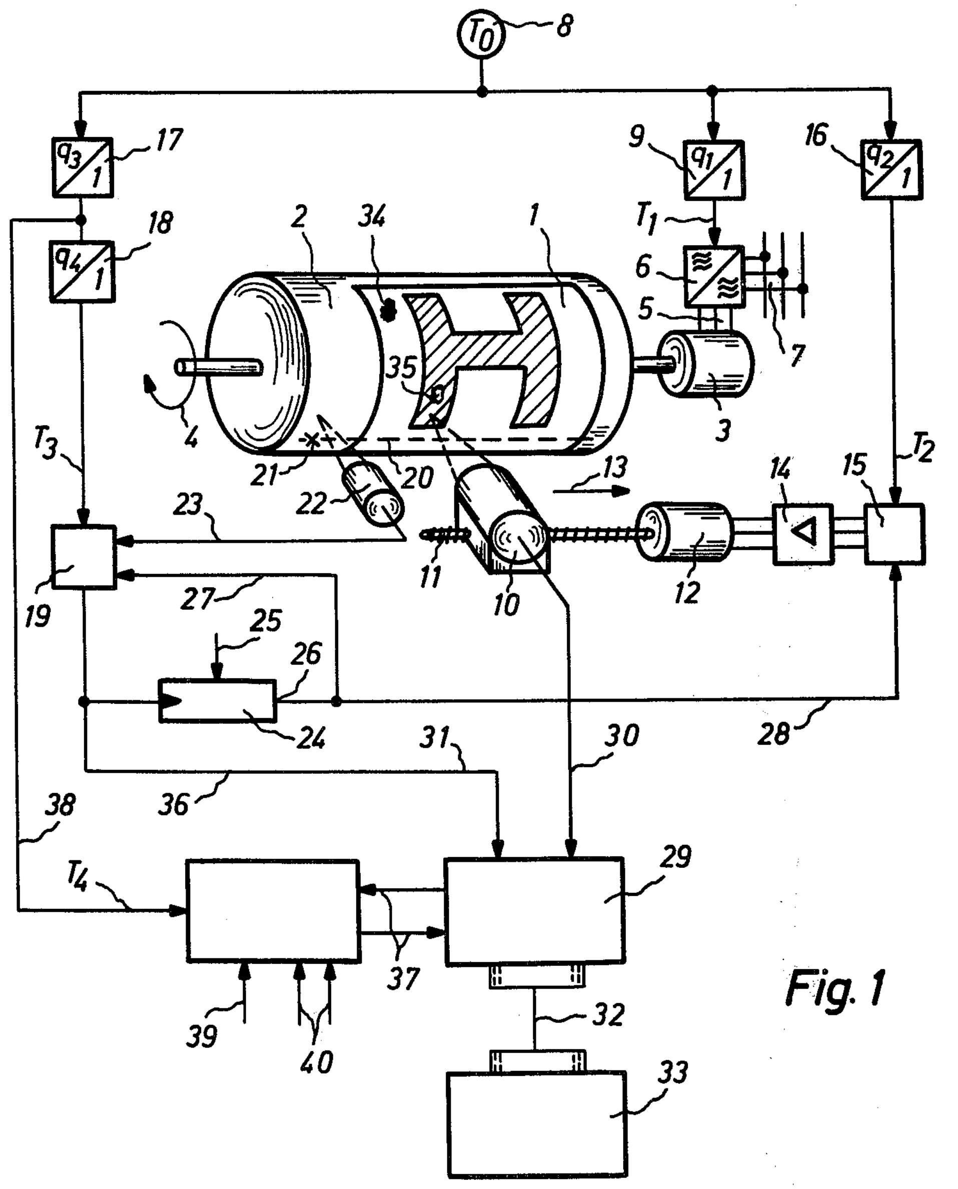
FIG. 1 is a schematic circuit diagram, in block form, illustrating the general components of a type character scanning apparatus in accordance with the invention.

Referring to FIG. 1, which illustrates in general, the circuitry of a type character scanning apparatus, a type character pattern 1, illustrated in the present example as being in the form of a letter "H," is tensioned on a scanning drum 2 which is driven in the direction of arrow 4 by a synchronous motor 3. The motor 3 is supplied with power from a modified power supply 5 which is produced from a primary main power supply 7 by means of a converter 6, controlled by a guide control pulse sequence $T_1$, whereby the frequency of the supply 5 is dependent upon such sequence. The sequence $T_1$ is illustrated as formed by a frequency division of a pulse sequence $T_o$ of a control oscillator 8, in which the frequency division is effected in a divider stage 9 disposed between the control oscillator 8 and the converter 6.

The type character pattern 1 is scanned in a dot and line fashion by means of an opto-electronic scanning device 10, operative to produce an image signal, with the scanning device 10 being advanced step-by-step along the scanning drum 2 in the direction of arrow 13, parallel to the axis of the drums by suitable means such as threaded lead shaft 11 rotated by a stepping motor 12. The stepping motor 12 is controlled in accordance with a guide pulse sequence $T_2$ over an output amplifier 14 and a motor control stage 15, with the guide pulse sequence being derived from the pulse sequence $T_o$ of the control oscillator 8, by means of frequency division in an additional divider stage 16.

The type character is subdivided into parallel image lines by the scanning process, with such lines extending in circumferential direction. Following the scanning of an image line, the scanning device 10 is advanced one step in the direction of the arrow 13, to the next image line with the step width being dependent upon the desired horizontal resolution of the type character.

Each image line comprises alternating white and black segment in accordance with the contour configuration of the type character, and the image signal thus may assume either of two different conditions, a high level, or a low level, in accordance with the respective signals scanned, each condition change being indicated by a level jump from high to low or low to high. Further, the image lines are divided into a number of arbitrary scanning elements, utilizing a scanning pulse sequence $T_3$, whereby a single scanning element is assigned to each pulse. The number of scanning elements per image line is dependent upon the height and the desired resolution of the type character in circumferential direction.

The scanning pulse sequence $T_3$ is also formed from the pulse sequence $T_o$ of the control oscillator 8 by frequency division in a divider stage 17, whereby the frequency can be adjusted by a division factor of $q_4$.

The scanning pulse sequence $T_3$ is initiated in a synchronization stage 19 in predetermined phase relation by a command signal "start scan," and is interrupted with a command signal "end scan."

The start of the scan of each image line is determined by a starting line 20, extending parallel to the axis of the drum 2 at the lower margin of the type character pattern 1 with the command "start scan" being obtained once per revolution of the scanning drum 2 by the scanning of a mark 21 disposed on the starting line 20, by a pulse generator 22, with the command being conducted to the synchronization stage 19 over a line 23. Upon the issuance of a command signal "start scan" the scanning pulse sequence $T_3$ is entered into a scanning element counter 24 in which the number of pulses are counted, with the counter being preset to the length of the type character pattern 1 over a programming input 25. If the number of counted pulses entered into the counter corresponds with the number of the preset pattern length, the upper margin of the type character pattern 1 has been attained, and the scanning element counter 24 emits the command "end scan," over a signal output line 26 and line 27, to the synchronization stage 19 for interrupting the scanning pulse sequence $T_3$.

Figure 4:
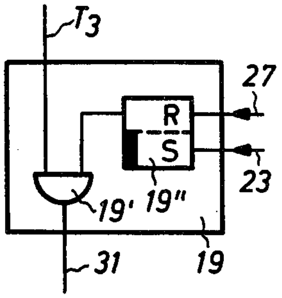
FIG. 4 is a circuit diagram illustrating, in greater detail, an example of a synchronizing stage employed in the invention.

As illustrated in FIG. 4, the synchronization stage 19 may, for example, comprise a gate 19' which is controlled by a RS-flip-flop 19", with the output from the pulse generator 22 being supplied to the S input over the line 23 and the "end scan" command signal being supplied to the reset input R over line 27 from the output of the counter 24. One input of the gate 19' receives the pulse sequence $T_3$ from the divider 18 while the other input of the gate is connected to the output of the flip-flip 19".

Figure 5:
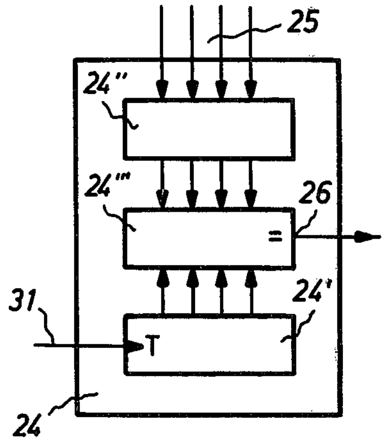
FIG. 5 is a circuit diagram illustrating, in greater detail, an example of a counter which may be employed in the invention.

Likewise, referring to FIG. 5, the scanning element counter 24 may comprise a binary counter 24' (for example a commercially procurable integrated module type SN 7493), a register 24" (for example a type SN 74,175 module) for the input of the pattern length over the programming input 25, and the comparator 24''' (for example a type SN 7485 module) which continuously compares the counter position of the binary counter 24' with the prescribed value in the register 24" and, when equality exists, the command signal "end scan" appears at the signal output 26 thereof. The output on line 26 is also conducted over line 28 to the motor control 15.

The individual segments of the image lines are sequentially coded into white and black values by means of a coding device 29, which is supplied with the image signal from the scanning device 10 over the line 30 and is likewise supplied with the scanning pulse sequence $T_3$ over line 31, which is operatively connected to the output of the synchronizing stage 19, i.e., to the output of gate 19'.

The measurement of the individual segment lengths is effected, in the form of multiples of the scanning elements, in the coding device 29, in which the number of pulses of the scanning pulse sequence $T_3$, occurring within each time interval between two level jumps of the image signal, are continuously counted in binary fashion as white or black values. All black and white values determined during the scanning of a type character pattern represent the type data for a type character, and are transferred to a data carrier 33 over a line 32. The type data can then be supplied from the data carrier 33 for control of the type data store of the light type-setting arrangement involved.

The type character pattern 1 may exhibit several different defects, the type and cause of which has been previously explained. A "black" defect 34, for example, may be present on the white portion of the pattern carrier, and in like manner a "white" defect 35 may be present on the pattern 1 within the black area of a portion of the type character pattern. Such unretouched defects should not be carried through the system and eventually stored with the type data.

In the scanning of the type character pattern 1, the defects initially are picked up by the scanning device 10 along with the actual desired image information, and are also registered as white-or black values in the coding device 29. The length of the black and white segments are respectively compared with a prescribed minimum segment length and if the segment has a length less than the prescribed minimum, a masking-out stage 36 is actuated, which is in operative connection with the coding device 29 over lines indicated generally in FIG. 1 by the reference numeral 37. If a segment length is greater than the minimum prescribed length, the white or black value representing such segment passes through the coding device without change and is entered into the data carrier 33. However, if the segment length is smaller than the minimum length, the segment is evaluated as a defect and a masking-out command signal is produced. In addition thereto, the black or white values of the defect, and the values of the immediately previous scanned segment are then combined as a summation value which is then supplied to the data store 33 as a corrected value.

The minimum length is determined as a number of pulses of a count pulse sequence $T_4$. Advantageously, the pulse spacing of the count sequence $T_4$ is so selected that it is smaller than the pulse spacing of the scanning pulse sequence $T_3$ and also independent of the vertical resolution of the image line. The count pulse sequence $T_4$ consequently conveniently may be derived at the connection between the divider stages 17 and 18, and conducted over line 38 to the masking-out stage 36. The minimum length can be preset at a programming input 39 of the masking-out stage 36, and the determination as to whether "white" and/or "black" defects are to be suppressed can be determined at the additional programming input 40 thereof.

It is, of course, also possible to count the number of pulses of the count pulse sequence $T_4$ occurring in the interval between two level jumps of the image signal, and to derive a masking-out command signal by comparing the counting result obtained with the prescribed number of pulses of the count pulse sequence $T_4$.

Figure 2:
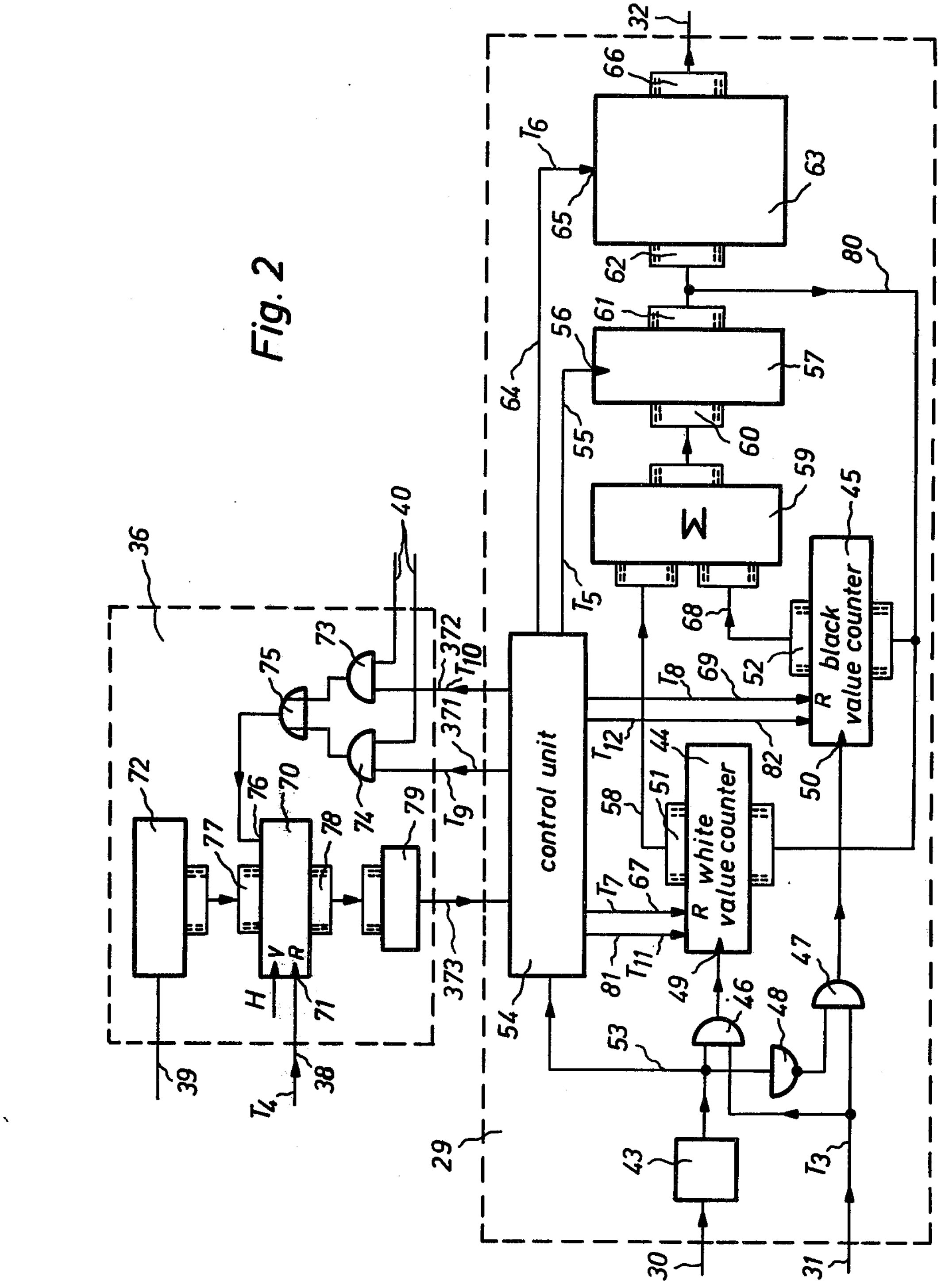
FIG. 2 is a schematic circuit diagram, also in block form, illustrating in greater detail a coding device and masking-out stage employed in the invention.

FIG. 2 illustrates, in greater detail, an example of the masking-out stage 36 and the coding device 29, and in particular the connection and coordination therebetween.

The image signal produced by the scanning device, not illustrated in FIG. 2, is conducted to a converter stage 43 over line 30 which, in dependency of the white or black segment of the image line presently scanned, forms a TTL-signal representative of the white level or the black level. The converter stage 43 may be a known threshold value switch which can assume two output conditions which, in this case, is dependent upon either the white level or the black level. The white level, for example, corresponds to the H-signal and the black level corresponds to the L-signal.

A counter 44 is provided for the white values, and a counter 45 for the black values, for determining the values of the respective individual segments. Such counters may, for example, be constructed of four-bit-binary counters (type SN 7493, Texas Instruments). These, as well as all other integrated components herein referred to can be obtained on the open market and are known to those skilled in the art, whereby specific description thereof may be omitted.

The scanning pulse sequence $T_3$ is conducted over line 31 to gates 46 and 47 which, along with gate 48, determine, in dependence upon the level of the image signal, whether the signal is conducted to the pulse input 49 of the white value counter 44, or to the pulse input 50 of the black value counter 45. When the white level of the image signal is present, the AND-gate 46 is prepared and the AND-gate 47 is blocked by the output of the inverter 48. Consequently, the pulses of the scanning pulse sequence $T_3$ are entered in the white value counter 44 and counted during the white level. The counting result representing the white value is supplied, in the example illustrated, at the data output 51 of the white value counter 44 as 8-bit-information. If, however, the black level of the image signal appears at the output of the converter stage 43, the counting operation in the white value counter 44 is interrupted, the scanning pulse sequence $T_3$ is connected to the input 50 of the black value counter 45, and the following pulses are counted in the black counter 45 to determine the black value, with such black value thus appearing at the data outputs 52 of the counter 45.

Each level jump in the image signal is also conducted over line 53 to a control unit 54 which produces a store pulse $T_5$, conducted over line 55 to the pulse input 56 of a store register 57, which register, in the embodiment illustrated, would comprise eight individual D-flipflops for accommodating the 8-bit black or white values, and may comprise for example a module of the type SN-74100.

The values at the data outputs 51 of the white value counter 44 are conducted to the store register 57 over line 58, an adder 59, and the D-inputs 60 of the register. If no masking-out command from the masking-out stage 36 is present, the transfer of the white value from the store register 57 into a store 63 subsequently results over the Q-output 61 of the register and the data inputs 62 of the store 63. A write pulse $T_6$ is formed in the control unit 54, which pulse is conducted over a line 64 to the command input 65 of the store 63.

At the end of the black phase of the image signal, indicated by a new level jump, the resetting of the white value counter 44 is effected by means of a reset impulse $T_7$ which is conducted to the counter from the control unit 54 over a line 67, and the take-over of the black value assigned to the black phase into the store register 57 is effected over the data outputs 52 of the black counter 45 over line 68, adder 59 and the D-inputs 60 of the register.

The resetting of the black value counter 45 is effected by means of an additional resetting impulse $T_8$ which is supplied to the black value counter 45 with each succeeding level jump of the image signal over line 69. The alternate transfer of the white and black values from the counters 44 and 45 into the store 63, over the store register 57 continues in a manner described until the scanning device 10 scans a defect and as a result a masking-out command signal is produced in the masking-out stage 36. As illustrated in FIG. 2, the masking-out stage 36 comprises primarily a sequential counter 70 constructed, for example, of several forward-backward-decimal counters, for example of the type SN 74190N, connected in cascade and operated as backward counters. The backward counter input 71 is supplied with the counting pulse sequence $T_4$ over line 38. The number of pulses corresponding to a desired minimum length is set as a decimal number on a coding switch 72 over programming inputs 39 thereof.

The control unit 54 continuously produces two take-over pulses from the level jumps, in dependence upon the black or white values appearing in the image signal, which is supplied thereto over line 53. The first take-over pulse $T_9$ appears in the presence of a jump of the image signal from the black level to the white level and is conducted to the signal input 76 of the counter 70 over a line 371, AND-gate 74, and OR-gate 75. The second take-over pulse $T_{10}$ is produced in the presence of a jump of the image signal from the white level to the black level, and likewise can be connected to the signal input 76 of the counter 70 over a line 372, an additional AND-gate 78 and OR-gate 75. Whether the signal input 76 is supplied with take-over pulses $T_9$ or take-over pulses $T_{10}$ is determined by the values set at the programming input 40 of the masking-out stage 36. For example, assuming that only "white" defects are to be eliminated, the AND-gate 74 would be prepared, and with each take-over pulse $T_9$ in a black-white change of the image signal, the decimal number set by the coding switch 72 is conducted to the counter 70 over the data inputs 77.

The assumed decimal number represented by the count pulse sequence $T_4$ is counted in the counter 70 and if the counter position is "0" a coder 79, connected with the data output 78 of the counter 70 supplies a masking-out command signal to the control unit 54 over line 373. Thus, two different situations are to be considered.

If the sequential counter 70 is counted to zero in a white or black phase of the image signal, the length of the associated white or black segment of an image line is greater than the preset minimum length and no masking-out command signal is produced. The take-over of the black and white values determined in the black value counter 45 and in the white counter 44 are thus supplied to the store 63 of the coding device 29 in the manner described.

If the counter 70, however, is not counted to zero in a white or black phase, the length of the corresponding white or black segment of an image line is smaller than the minimum length. The respective segment is then evaluated as a defect and a masking-out command signal is supplied to the control unit 54 by the coder 79. The masking-out signal initially suppresses the reset impulse for the white value counter 44 or the black value counter 45 so that the particular counter position is maintained. The white value or black value is supplied to a summation value in the adder 59 and, in response to a store pulse $T_5$ supplied to the register 57 over line 55, the summation value is entered into the store register 57.

Subsequently the take-over of the summation value into the white value counter 44 results over a line 80 in the event the defect lies in a white segment, or into the black value counter 45 in the event the defect appeared in a black segment. Such transfer is controlled by take-over pulses $T_{11}$ and $T_{12}$, supplied from the control unit 54 to the corresponding counters over respective lines 81 and 82.

The summation value taken over forms the corrected white or black value and represents the initial value for determining the black or white value of the segment adjoining the defect on the image line.

Figure 6:
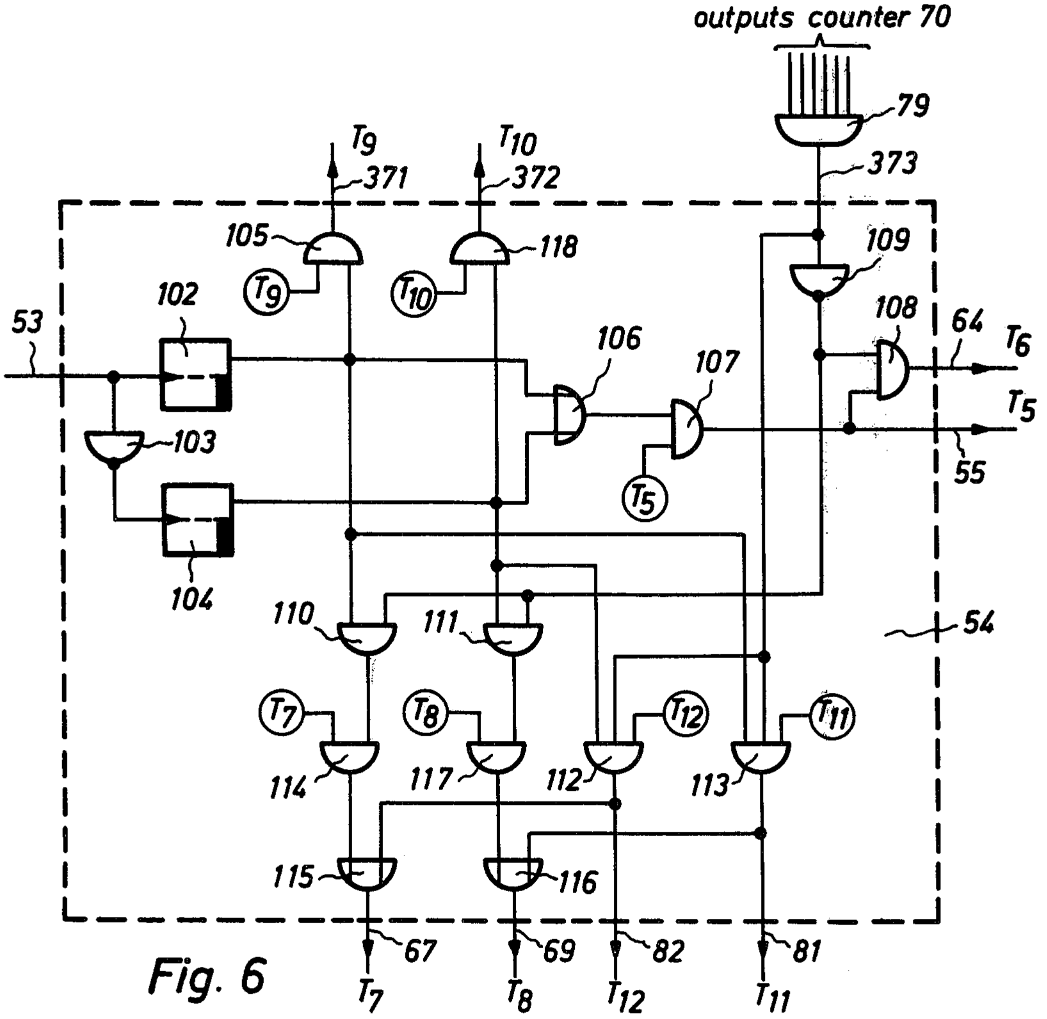
FIG. 6 is a circuit diagram illustrating, in greater detail, an example of a control unit which may be employed in the invention.

FIG. 6 illustrates, in greater detail, an example of the control unit 54. The image signal on line 53, at the output of the converter stage 43, controls a flipflop 102 and, over an inverter 103, an additional flipflop 104, so that with each signal jump from the black level to the white level, at the beginning of a white segment, the output of the flipflop 102 reaches the H-level, preparing an AND-gate 105, whereby the take-over pulse $T_9$ is supplied to the line 371. The H-signal simultaneously is supplied to an AND-gate 107 over OR-gate 106 to open the AND-gate 107, whereby the store pulse $T_5$ is supplied to the line 55.

If the masking-out command signal on the line 373 is "L" when the signal jump appears from the black level to the white level (no masking-out) an additional AND-gate 108 is prepared over an inverter 109 and the store pulse $T_5$ simultaneously is supplied over AND-gate 108 to line 64 as write pulse $T_6$. The AND gates 112 and 113 are blocked with the masking-out command signal "L," and the AND-gate 110 is prepared. In such case the reset pulse $T_7$ for the white value counter 44 is supplied to line 67 over AND-gate 114, and OR-gate 115.

However, if the masking-out command signal on line 373 is "H," the AND-gate 108 is blocked and the write pulse $T_6$ is interrupted. In this case the AND-gates 110 and 111 are simultaneously blocked. However, the AND-gate 113 is prepared whereby the pulse $T_{11}$ is supplied to line 81 as take-over pulse $T_{11}$ for the white value counter 44, and is supplied as reset impulse $T_8$ over OR-gate 116 to the line 69.

With an image signal jump from the white level to the black level at the beginning of a black segment, the output of the flipflop 104 reaches the H-level whereby the AND-gate 118 is prepared, and take-over pulse $T_{10}$ is supplied to line 372. The corresponding control of pulses $T_5$, $T_6$, $T_7$, $T_8$, $T_{11}$, and $T_{12}$ takes place in corresponding manner to that previously described.

Figure 3:
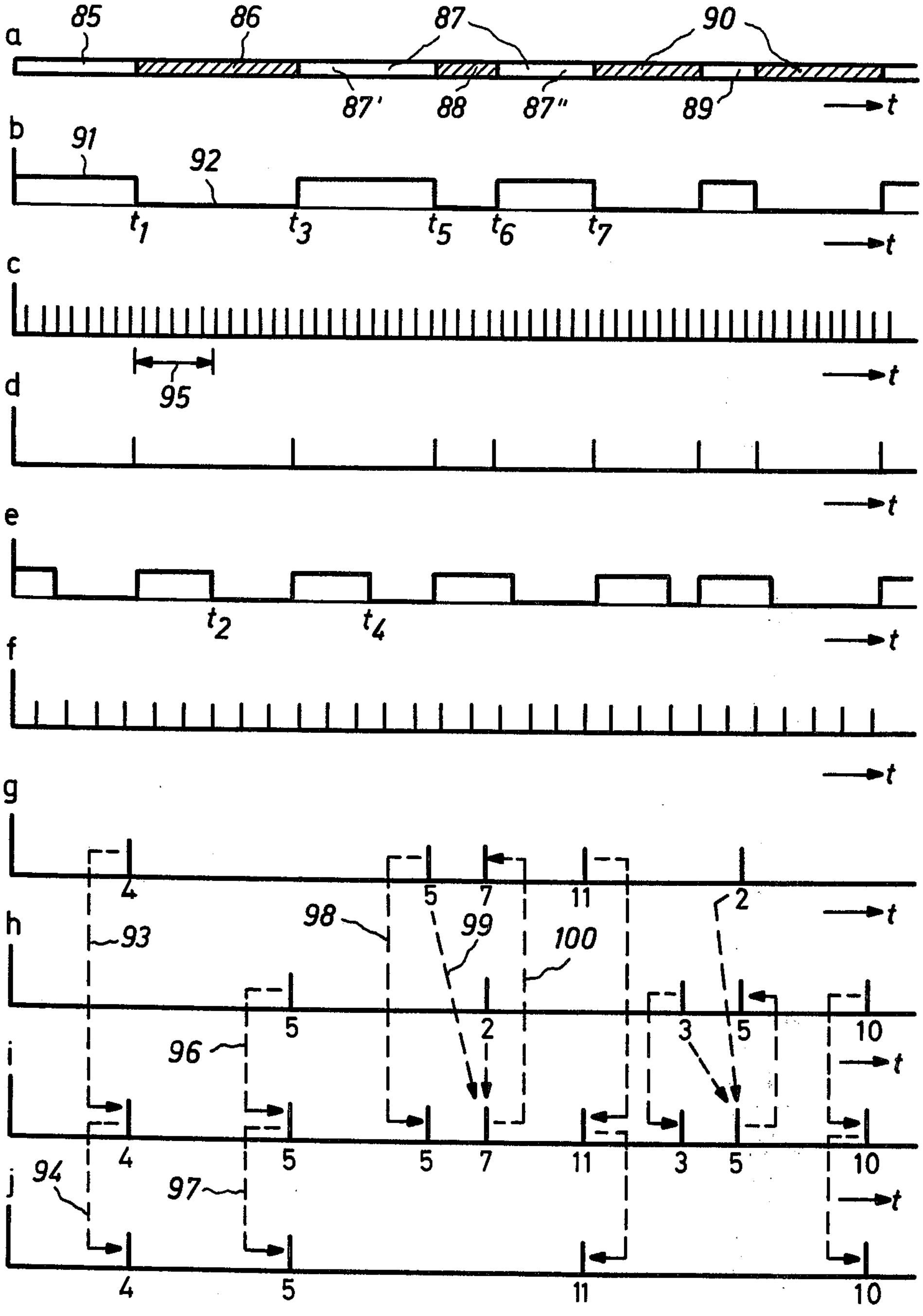
FIG. 3 is an impulse diagram illustrating the relationship of the operation of the various components of the invention.

The operational characteristics of the masking-out stage 36 and coding device 29 will be further explained in conjunction with FIG. 3, which represents an impulse diagram by means of which the determination of the black and white values will be apparent. In the Figures:

Line a represents a portion of an image line which, for example, may comprise a white segment 85, a black segment 86, an additional white segment 87 containing a black segment 88 to be evaluated as a defect, and a black segment 90 containing a white segment 89 to be evaluated as a defect.

Line b illustrates the corresponding image signal having a white level 91 and a black level 92.

Line c illustrates pulses of the counter sequence $T_4$.

Line d illustrates the take-over pulses $T_9$ or $T_{10}$ produced in the control unit 54, by means of which the respective decimal number corresponding to the minimum length of time is entered into the counter 70. It may be assumed that not only white but also black defects are to be retouched, in which case the take-over of the decimal number into the counter 70 results with each level jump of the image signal.

Line e represents the masking-out command signal produced by the coder 79 which signal is at the H-level as long as the counter position of the counter 70 is not zero, and is at the L-level when the counter has counted to zero.

Line f represents pulses of the scanning pulse sequence $T_3$.

Line g illustrates the respective counter positions of the white value counter 44.

Line h illustrates the respective counter positions of the black value counter 45.

Line i illustrates the white, black, or summation values intermediately stored in the register 57.

Line j illustrates the corrected black and white values of the retouched image line, which values represent the type data.

In the following description of the operation, in conjunction with FIG. 3, the respective letters in parenthesis will indicate the appropriate line of FIG. 3 involved.

At time $t_1$ the white segment 85 will have been scanned and the image signal makes a jump from the white level 91 to the black level 92 (b). Simultaneously therewith, four pulses of the scanning pulse sequence $T_3$ will have been counted into the white counter 44 (f), and the white value for the white segment 85 accordingly is "4" (g).

Such white value "4" is transferred into the store of register 57 (i) as indicated by broken line 93 and is subsequently transferred therefrom into store 63 (j), as indicated by line 94.

Simultaneously with these operations, at time $T_1$, take-over signal $T_9$ also appears (d). The minimum length of a particular condition, i.e., segment length, will be equal to a specific number of pulses of the count pulse sequence $T_4$ (c), which will be entered into the counter 70 whereby the latter is counted back. In the particular example illustrated, six pulses of the count pulse sequence $T_4$, indicated by arrow 95, represent the selected prescribed minimum length. Thus, the counter 70, following six pulses, is counted blank at time $T_2$, and the output of the coder 79 reaches the L-level (e).

At time $t_3$ the scanning of the black segment 86 is completed and the image signal makes a jump from the black level to the white level (b).

The black value counter 45 has counted five pulses of the scanning sequence $t_3$ during the scanning of the black segment 86 in the time interval $t_3-t_1$ (h). Thus, the counting result corresponds to a black value "5" for the black segment 86. As the output of the coder 79 already lies at the L-level at the time $t_3$, the length of the black segment 83 is larger than the minimum length and no summation results. The black value "5" is therefore transferred into the store register at time $t_3$, as indicated by line 96, and is transferred therefrom into the store 63 (j), as indicated by line 97.

The resetting of the white value counter 44, the renewed take-over of the minimum length into the counter 70 (e), and the backward count operation simultaneously take place.

At time $t_4$ the counter 70 has already counted to zero whereas the scanning of the first partial segment 87' of the white segment 87 is not completed until time $t_5$. During the time interval $t_5 - t_3$ the white value "5" for the partial segment 87' was determined in the white value counter 44.

As the output of the coder 79 has already reached the L-level at the time $t_4$, the length of the partial segment 87' is greater than the prescribed minimum length and the white value "5" assigned to the partial segment 87' is conducted into the store register 57 (i) at time $t_5$ which operation is represented by line 98.

A renewed take-over of the minimum length into the counter 70 and the backward counting operation result simultaneously. During the time $t_6 - t_5$ the black segment 88 is scanned and the black value "2" is determined (h). However, as the counter 70 at time $t_6$ has not yet counted to zero, the output of coder 70 lies at the H-level. The length of the black segment 88 thus is smaller than the minimum length and such segment is therefore evaluated as a defect. The resetting, i.e., zero positioning of the white value counter 44 is therefore initially suppressed at the time $t_6$. The addition of the white value, "5" and the black "2" into the summation value "7" is then effected in the adder 59 and such value is transferred into store 57, as illustrated by line 99, with such summation value than being taken over as corrected white value "7" in the white value counter 44, as illustrated by line 100.

As the black segment 88, recognized as a defect, is followed by the white partial segment 87'', the counting process is continued in the white value counter 44, with the corrected white value "7" so that the white value "11" is determined at the end of the white partial segment 87''. This result represents the white value for the retouched total white segment 87, which is first transferred into the store register 57 and therefrom into the store 63 at the time $t_7$.

The operations for the electronic retouching of the white defect 89 in the black segment 90 proceed in a corresponding manner.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A method of electronically retouching a pattern in connection with the production of recording data relating thereto, comprising the steps of electro-optically scanning the pattern in a dot and image line fashion to form an electrical image signal from a sequence of alternating scanning conditions which respectively represent the black and white segments of a scanned image line, establishing a minimum length for respective conditions, in the form of an electrical signal, comparing each electrical signal, representing a respective scanned condition, with the electrical signal representing the corresponding established minimum length, transforming an image signal representing a condition having a lesser length than the corresponding established minimum length, comprising a defect, into a signal representing the alternate condition immediately preceding such defect condition, thereby forming a continuation of such preceding condition, with the condition immediately following such defect condition likewise being of such alternate condition and thus representing a completion of the corresponding condition preceding the defect, with such total of three successive conditions representing a retouched pattern segment.

2. A method according to claim 1, comprising effecting said comparison by counting the number of pulses of a count-pulse sequence occurring in the duration of each signal representing a condition, and comparing the number of pulses so counted with the number of pulses of such count-pulse sequence occurring in the duration of the corresponding signal representing an established minimum length.

3. A method according to claim 2, comprising simultaneously counting the number of pulses of a scanning-pulse sequence occurring in the duration of each signal representing a condition as a binary number, and in the event the length of a signal representing a condition is less than the signal representing the minimum length therefor, adding the binary number of such condition to the binary number of the preceding condition, and adding the binary number of the signal representing the next following condition, i.e. of the same type as the first-mentioned condition, to the total of the binary number of the latter signal and that of the immediately following condition.

4. A method according to claim 1, comprising counting the number of pulses of a count-pulse sequence occurring in the duration of the respective signal representing each condition, comparing the number of pulses so counted with the number of pulses of such count-pulse sequence occurring in the duration of the signal representing the corresponding established minimum length, simultaneously counting the number of pulses of a scanning-pulse sequence occurring in the duration of the signal representing each respective condition, temporarily storing the total number of scanning pulses so counted, for the duration of the counting of count pulses representing the signal of the next immediately following condition, releasing said stored total of scanning pulses to a carrier as the recording data for the condition represented thereby, in the event, in said comparison, the number of counting pulses for such immediately following condition equals or is greater than the number thereof representing the minimum length therefor, and in the event the total of count pulses for such immediately following condition is less than that of the minimum length therefor, adding the total number of scanning pulses of said immediately following condition to the stored value of the preceding condition, and adding the scanning pulse total of the next following condition, i.e., of the same type as the first-mentioned condition, to the stored total of the latter and the immediately following condition, with such total scanning pulses of the three succeeding conditions representing a "retouched" segment.

5. A method according to claim 4, wherein the frequency of the count pulse reference is greater than that of the scanning pulse sequence.

6. An apparatus for electronically retouching a pattern in connection with the reproduction of recording data relating thereto, comprising:

- a scanning member for scanning a pattern dot-by-dot and line-by-line to obtain an image signal having alternating conditions which respectively represent the black and white segments of the scanned image lines,
- coding means coupled to said scanning member operable to transform the alternating conditions of the image signal into recording data,
- a generator for producing a count pulse sequence,
- counting means controlled by said image signal and receiving said count pulse sequence, operable for counting the numbers of pulses occurring in the duration of each condition of said image signal; the counted numbers of pulses representing the respective condition-lengths,
- defining a minimum length for a condition as a preset number of pulses of said count pulse sequence,
- comparator means operable to compare each counted number of pulses with said preset number of pulses and generating a control signal, whenever a condition-length is less than the defined minimum length,
- and coding conversion means coupled to said coding means operable by the influence of said control signal for converting recording data, representing a condition having a lesser length than the defined minimum length, into recording data representing the alternate condition immediately preceding such condition of lesser length so as to obtain "retouched" segments of scanned image lines.

7. An apparatus for electronically retouching a pattern in connection with the production of recording data relating thereto, comprising:

- a scanning member for scanning a pattern dot-by-dot and line-by-line to obtain an image signal having alternating conditions which respectively represent the black and white segments of the scanned image lines,
- a first generator for producing a scanning pulse sequence,
- coding means for run-length-encoding said alternating conditions of said image signal into binary numbers, said coding means comprising a counter receiving said scanning pulse sequence for counting the number of pulses thereof in the duration of each condition; said counted numbers being said encoded binary numbers representing the recording data,
- a second generator for producing a count pulse sequence,
- counting means controlled by said image signal and receiving said count pulse sequence, operable for counting the number of pulses occurring in the duration of each condition of said image signal; the counted numbers of pulses representing the respective condition-lengths,
- defining a minimum length for a condition as a preset number of pulses of said count pulse sequence,
- comparator means operable to compare each counted number of pulses with said preset number of pulses and generating a control signal whenever a condition-length is lesser than the defined minimum length,
- and coding conversion means coupled to said coding means and influenced by said control signal, operable to convert the recording data so as to obtain a "retouched" segment of an image line; said coding conversion means comprising a counter for adding the binary number of a condition having a lesser length than the defined minimum length to the binary number of the alternate condition immediately preceding such condition of lesser length, whereby the sum represents the starting value for determining the binary number of immediately following condition by said counter of said coding means.

8. An apparatus for electronically retouching a pattern in connection with the production of recording data relating thereto, comprising:

a scanning member for scanning a pattern dot-by-dot and line-by-line to obtain an image signal having alternating conditions which respectively represent the black and white segments of the scanned image lines, a first generator for producing a scanning pulse sequence, coding means for run-length-encoding said alternating conditions of said image signal into binary numbers, said coding means comprising a counter receiving said scanning pulse sequence for counting the number of pulses thereof in the duration of each condition; said counted numbers being said encoded binary numbers representing the recording data, a second generator for producing a count pulse sequence, counting means controlled by said image signal and receiving said count pulse sequence, operable for counting the number of pulses occurring in the duration of each condition of said image signal; the counted numbers of pulses representing the respective condition-lengths, defining a minimum length for a condition as a preset number of pulses of said count pulse sequence, comparator means operable to compare each counted number of pulses with said preset number of pulses and generating a control signal whenever a condition-length is lesser than the defined minimum length, a store for temporarily storing the total number of scanning pulses, counted for a condition, for the duration of the counting of the count pulses representing the next immediately following condition, a data carrier to which the stored total of scanning pulses are supplied, in the absence of said control signal, indicating that the total count of count pulses equals or is greater than that of the corresponding minimum length, and coding conversion means coupled to said coding means and influenced by said control signal, operable to convert the recording data so as to obtain a "retouched" segment of an image line; said coding conversion means comprising a counter for adding the binary number of a condition having a lesser length than the defined minimum length to the binary number of the alternate condition immediately preceding such condition of lesser length, the sum thereof representing the starting value for determining the binary number of the immediately following condition by said counter of said coding means, whereby the total scanning pulses of such three successive conditions supplied to the data carrier represents a "retouched" segment.

* * * * *